Feb. 5, 1924.
J. BERGE
SPEEDOMETER
Filed April 14, 1919
1,482,595
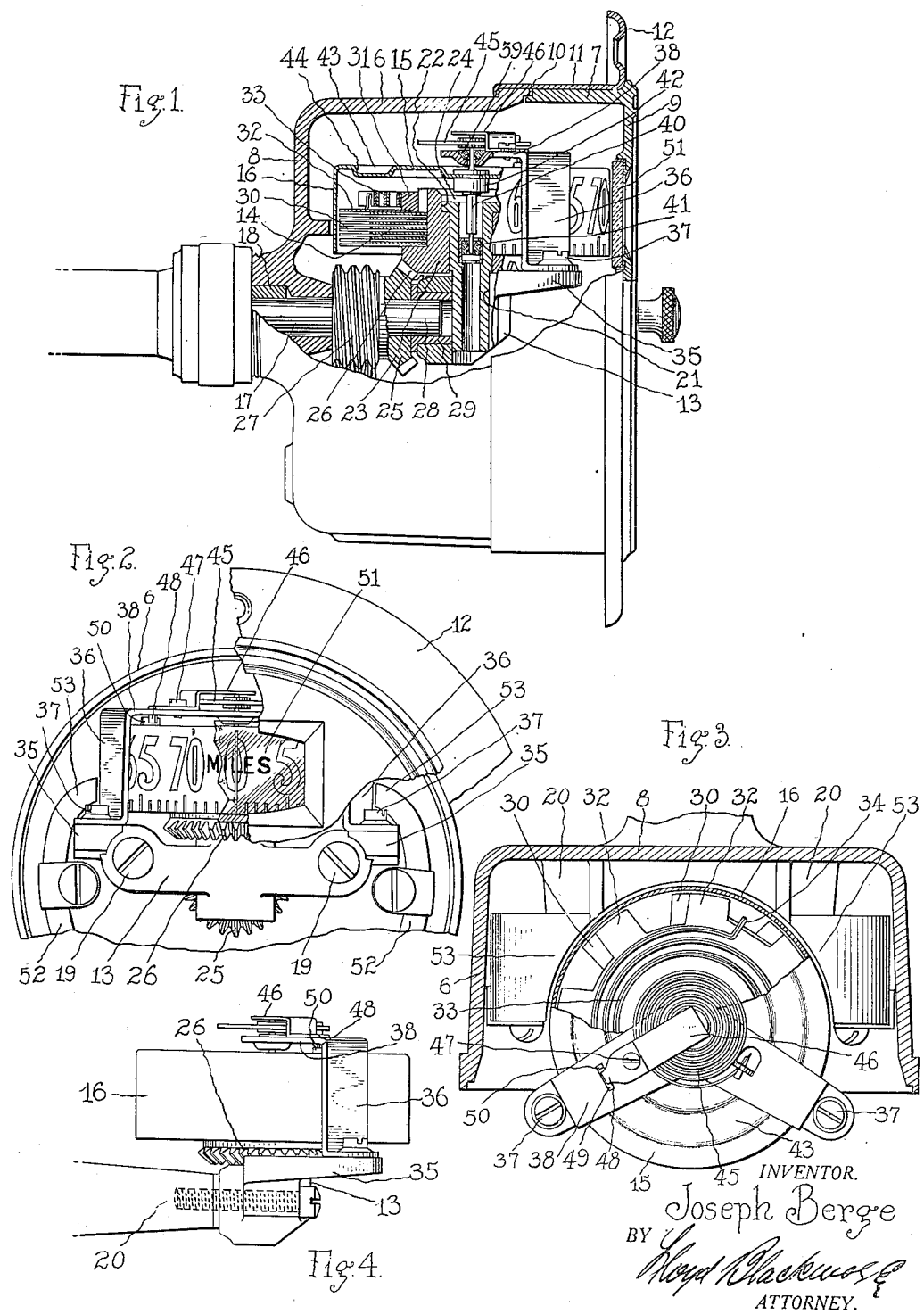
INVENTOR.
Joseph Berge
BY
Lloyd R Blackmore
ATTORNEY.

Patented Feb. 5, 1924.

1,482,595

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

SPEEDOMETER.

Application filed April 14, 1919. Serial No. 289,822.

*To all whom it may concern:*

Be it known that I, JOSEPH BERGE, a citizen of the United States, and resident of Flint, Genesee County, State of Michigan, have invented certain new and useful Improvements in Speedometers, of which the following is a specification.

My invention relates to speedometers designed for use with self propelled vehicles to indicate the speed at which the same is moving, and which also ordinarily includes registering or odometer mechanism for registering the distance traveled by the vehicle, and particularly to speedometers of the magnetic type or class wherein a light weight and delicately supported metallic speed cup or equivalent speed indicating member having characters to indicate the rate of movement per unit time is dragged along by the action of an armature rotating in a magnetic field in which the speed indicating member is located, the extent of the rotary or angular movement thus imparted to the speed indicating member or speed cup being dependent upon the rate of speed at which the armature is rotated by or through suitable driving mechanism from a wheel of the vehicle, and such angular movement being opposed by a spring operatively connected with said speed indicating member and acting to return the same to a zero reading when the vehicle is at rest.

This application relates to the armature and speed indicating member or speed cup of speedometer of the class or type above referred to, to the arrangement of said members relative to the main driving shaft of the instrument, and to the manner in which said elements are supported in proper position within the external shell or casing of the device, and the principal object of my invention as disclosed herein is to provide a construction which permits the armature and speed cup to be assembled and properly adjusted outside the casing of the instrument, and independently of the other elements thereof, as a separate mechanism complete in itself, and then introduced as a single unitary structure, mechanism or device into the casing of the instrument and secured in place therein, thus providing an instrument in which the elements in question may be more readily and cheaply assembled than has heretofore commonly been the case, and an instrument in which the armature and speed cup will be maintained in fixed and proper relationship to one another and independently of the other moving elements of the device and of the casing thereof.

A further object of my inventoin is to provide certain improvements in and relating to the rotating speed indicating member of the device, and other objects or ends to be attained will appear in the following detailed description of my invention and of the operation thereof.

The drawing accompanying and forming a part of this specification illustrates what I regard as the best form or embodiment of my invention, although it will be appreciated that the same may be embodied in various other specific forms the equivalent of the particular form shown, and that my invention includes all such variations and modifications of the particular embodiment thereof illustrated as come within the scope of the concluding claims wherein the features of which my invention consists are particularly pointed out.

In the drawing:

Figure 1 is a view partly in side elevation and partly in section upon a vertical plane extending longitudinally thereof of a magnetic speedometer having the improvements wherein my invention consists incorporated therein;

Figure 2 is a view showing the elements and features which comprise my invention in elevation and assembled within the casing of the instrument.

Figure 3 is a view showing my invention in plan and within the casing, certain parts being broken away to better show other parts, and the casing being sectioned upon a centrally located horizontal plane, and:

Figure 4 is a view showing certain features of my invention in side elevation.

Referring now to the drawing, the external casing of the speedometer within which the various mechanisms and sets of mechanisms thereof are contained and supported in proper relation with one another may be of any form and construction, as the invention to which this present application relates is in no way concerned with the details of the casing. The casing shown, however, comprises two cup-shaped casing sections 6, 7 annular in form whereby a cylindrical hollow casing having end walls 8, 9 is provided, and within which the mechanism of the speedometer is located, the open ends of the cup-shaped section members abutting with one another along a joint at 10 and the said sections being secured together by a securing member in the form of an annular band or sleeve 11 forced onto the casing members and overlaying the joint aforesaid, and having a flange 12 whereby the instrument may be secured in place in an opening in a dash or instrument supporting board of a vehicle. The subject-matter above referred to, however, as well as other features relating generally to the instrument, are more particularly disclosed in and forms the subject-matter of another application for patent prepared and filed by me upon April 14, 1919, for speedometers, Serial No. 289,821.

Located within the casing of the instrument is a support or bracket 13 whereby the rotating armature 14 and the speed indicating member or speed cup of the device are supported, the said speed cup having a top or end wall 15, and a depending annular peripheral side wall 16 annular in form extending from said end wall and upon which characters to indicate the speed of the vehicle are impressed, the armature being located within the speed cup, and the two rotating about one and the same vertically extending axis. The main driving shaft 17 of the instrument is rotatable within a bearing 18 carried by the end wall 8 of the casing, and the axis of the said driving shaft and the axis about which the armature and speed cup rotate are arranged at right angles to one another, as best shown in Figure 1.

The bracket or support 13 is detachably secured in place within the casing of the instrument as by means of screws 19 extending through openings provided therein and into threaded holes in the free inner ends of two pedestals 20 extending from the end wall 8 of the casing, and located one upon either side of the main driving shaft, and a hollow vertically extending stud shaft or tubular bearing 21 is carried by and projects at right angles from the said bracket, the lower end of said shaft extending into a passage in the bracket and the upper end thereof having an annular flange or shoulder 22 in the embodiment of my invention illustrated.

The reference numeral 23 designates a hub rotatable about the shaft or bearing 21 and having an enlarged recess 24 at its upper end within which the flange 22 lies, and the lower end of which hub is supported from the bracket 13 through a suitable washer, whereby movement of the hub along the said shaft is prevented, and said hub is driven from the main driving shaft through gears 25, 26 in mesh with one another. The main driving shaft also carries a worm gear 27 whereby odometer mechanism, not shown, is operated, and the free inner end 28 of said shaft preferably extends into a bearing 29 carried by the bracket 13, to thereby provide a steadier support for the said shaft.

The armature 14 of the instrument is carried by the rotating hub 23, which in fact is a part of the armature, and said armature also includes a plurality of toothed soft iron discs spaced apart from one another by washers placed between each two adjacent discs, so that a space will be left between the teeth 30 of each two successive discs, this construction being employed in order to lessen the driving effect of the air trapped between the teeth of the armature upon the delicately supported speed cup and which air, being carried around by the armature obviously acts as a force independent of the currents of electricity established in the peripheral wall of the speed cup by the rotating armature, and tending to rotate the speed cup about its axis.

The spaces between the teeth 30 obviously permit the teeth to move through the air and the air to remain at rest to a considerable degree, thus materially reducing the driving effect of the air upon the speed cup and, in addition, the spacing of the teeth reduces the foucault currents established in the armature, and secures the operation thereof at a lower temperature than would otherwise be the case because of the passage of air between the teeth.

The toothed discs which form the main body portion of the armature are so arranged that their teeth lie one directly above another, and said discs are held in place upon the hub by securing means including a ring 31 at the upper end thereof. A single disc having teeth 32 similar to the teeth of the other discs is located above the armature proper and is movable angularly relative thereto so that its teeth may be made to overlie the spaces between the teeth of the other discs of the armature to a greater or less extent, to thereby compensate for temperature changes in the instrument, the position of said last mentioned disc being controlled by a coiled thermostat 33 operatively connected with said disc at 34. The means aforesaid for compensating for variation in temperature, however, form no part of the invention to which this present application relates, and the same forms the subject matter of another application for patent executed and filed by me upon April 14, 1919, for magnet mechanism for magnetic speedometers, Serial No. 289,825.

The support or bracket 13 is provided with two horizontally arranged forwardly extending arms 35 the free ends of which support a yoke made up of two vertically extending sides or legs 36, the lower ends of which are secured to the arms 35 by screws 37, and a top cross bar 38 which extends into a position over the hollow shaft or support 21 and carries a jewel bearing 39 within which the upper end of a shaft 40, which carries the speed cup, is journaled, the lower end of said shaft being supported by a jewel bearing 41 located within the hollow shaft 21, as best shown in Figure 1 of the drawing.

The speed cup is supported from the shaft 40 through a suitable hub or boss 42, and the said cup is made from a thin and light metal in order to reduce the mass thereof to a minimum. The upper or end wall 15 of said speed cup is provided with an annular groove 43, whereby a rib 44 of similar form is secured, which construction provides a stiffer speed cup and one less likely to warp or become distorted when the device is in use than would be the case were such a rib not present.

The speed cup is dragged along by the rotating armature when the instrument is in use, the extent of angular movement being dependent upon the rate at which the armature is driven, as will be understood, and such movement is opposed by a hair spring 45 operatively connected with the speed cup and acting to return it to a zero reading when the vehicle is at rest.

Secured to and supported by the upper cross-bar 38 of the yoke aforesaid is a combined safety and stop member having an arm 46 extending over the upper end of the shaft 40 which carries the speed cup and spaced slightly from the extremity thereof, and which arm therefore acts to prevent upward movement of the speed cup due, for example, to vibration or to sudden jars to which the instrument may be subjected when in use, said member being held to the cross member of the yoke by a screw 47. The member aforesaid is also provided with a stop 48 which extends downward and through a hole 49 in the cross-bar of the yoke, and into the path of a second stop 50 carried by the speed cup and located within the annular groove 43 thereof. These two stops when in contact determine the zero or no speed indicating position of the speed cup, and, as will be appreciated, the position of the stop 48 may be adjusted by loosening the screw 47 and moving the combined safety and stop member angularly about the same as an axis without however, moving the arm 46 thereof out of its position above the upper end of the shaft 40 or interfering with its action in preventing upward movement of the speed cup. The adjustment thus provided for is to enable the zero character or line upon the speed cup to be brought into coincidence with a vertical cross line upon a transparent member 51 secured in an opening provided in the end wall 9 of the casing, and through which the speed cup may be seen, as will be appreciated.

The magnetic field within which the armature and the speed cup rotate is established by a C-shaped or horseshoe magnet 52 secured in place within the casing, and the poles 53 of which lie adjacent the periphery of the speed cup and are adjustable toward and from the same, the means for securing the magnet in place and providing for the adjustment of the poles thereof forming the subject matter of a separate application filed by me.

In view of the premises it will be appreciated that the armature and thermostatic compensating mechanism, and the speed cup and the elements associated therewith, may be assembled by themselves and with the supporting bracket 13 and introduced into or removed from the casing of the instrument as a single unitary structure or mechanism, and that none of the elements supported by the supporting bracket are connected with any other element of the instrument except through the driving gearing for the armature and through the pedestals which support the bracket, from which it follows that the elements supported by the bracket are not likely to get out of adjustment after having once been properly adjusted, and that the said elements will be held in proper position relative to one another better than would be the case if each element was provided with individual means for positioning it within the casing of the instrument.

As changes of construction could be made within the scope of my invention, it is intended that all matter contained in the above description or shown in the accompanying drawings shall be interpreted as illustrative and not in a limiting sense.

Having thus described and explained my invention, I claim and desire to secure by Letters Patent:—

1. In a speedometer of the class described, a speed cup having an end wall, a peripherally extending annular side wall extending at right angles to said end wall, an annular groove formed in the material of said end wall, a stop lug located within said annular groove, and a stop member with which said stop lug engages.

2. In a speedometer of the class described, a rotatable speed indicating member, a shaft whereby said member is supported, a stop carried by said member, a support located adjacent said speed indicating member and having a bearing for the said shaft, and a combined safety and stop member carried by said support and having an arm extending over the bearing aforesaid, and a stop located in the path of movement of said first mentioned stop.

3. In a speedometer of the class described, a support having a bearing for a shaft, a unitary adjustable combined safety and stop member carried by said support and having an arm extending over said bearing and a stop extending through an opening provided in said support, and a speed indicating member having a stop lug adapted to engage said stop.

4. In a speedometer of the class described a rotatable speed indicating member, a shaft whereby said member is supported, a stop carried by said member, a support located adjacent said speed indicating member and having a bearing for the said shaft, and an adjustable combined safety and stop member carried by said support and having an arm extending over the bearing aforesaid, and a stop extending through an opening provided in said support and into the path of movement of the stop carried by said speed indicating member.

In testimony whereof I affix my signature.

JOSEPH BERGE.